(12) United States Patent
Kruspe et al.

(10) Patent No.: US 6,739,409 B2
(45) Date of Patent: May 25, 2004

(54) METHOD AND APPARATUS FOR A DOWNHOLE NMR MWD TOOL CONFIGURATION

(75) Inventors: Thomas Kruspe, Wienhausen (DE); Robert A. Slade, Witney (GB); Martin Blanz, Celle (DE); Peter Rottengatter, Isernhagen (DE); Hartmut Schrader, Nienhagen (DE); Rob Hawkes, Dry Dayton (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/059,565

(22) Filed: Jan. 29, 2002

(65) Prior Publication Data

US 2002/0153136 A1 Oct. 24, 2002

Related U.S. Application Data

(63) Continuation-in-part of application No. 09/839,423, filed on Apr. 20, 2001, now Pat. No. 6,446,736, and a continuation of application No. 09/247,340, filed on Feb. 9, 1999, now Pat. No. 6,247,542.

(51) Int. Cl.[7] .............................................. E21B 49/00
(52) U.S. Cl. ......................... 175/50; 175/40; 166/254.2
(58) Field of Search .................. 175/50, 40; 166/254.2; 324/303, 356, 369, 346, 355, 366

(56) References Cited

U.S. PATENT DOCUMENTS

| | | | | |
|---|---|---|---|---|
| 3,497,019 A | * | 2/1970 | Orloft ............................ | 175/27 |
| 5,555,946 A | * | 9/1996 | Klatt ............................ | 175/61 |
| 6,163,151 A | | 12/2000 | Wisler et al. | |
| 6,173,793 B1 | * | 1/2001 | Thompson et al. ............ | 175/45 |
| 6,179,066 B1 | * | 1/2001 | Nasr et al. .................... | 175/45 |
| 6,179,793 B1 | | 1/2001 | Rothman et al. .............. | 601/44 |
| 6,215,304 B1 | | 4/2001 | Slade ............................ | 324/303 |
| 6,247,542 B1 | * | 6/2001 | Kruspe et al. ................ | 175/40 |
| 6,446,736 B1 | * | 9/2002 | Kruspe et al. ................ | 175/40 |
| 2002/0108784 A1 | * | 8/2002 | Kruspe et al. ................ | 175/40 |

FOREIGN PATENT DOCUMENTS

| | | |
|---|---|---|
| EP | 0560893 | 11/1996 |
| EP | 1072903 | 1/2001 |
| GB | 2333308 | 7/1999 |
| GB | 2334982 | 9/1999 |
| GB | 2354543 | 9/1999 |
| GB | 2370304 | 2/2001 |
| WO | WO 99/36801 | 7/1999 |
| WO | WO 99/45234 | 9/1999 |

* cited by examiner

*Primary Examiner*—David Bagnell
*Assistant Examiner*—Giovanna M. Collins
(74) *Attorney, Agent, or Firm*—Madan, Mossman & Sriram, P.C.

(57) ABSTRACT

An NMR device is presented that includes a drill collar having non-rotating sleeve containing permanent magnets. The non-rotating sleeve is clamped against a borehole wall and decoupled from drilling vibrations during NMR measurements. The transmitter and receiver are located on the rotating part of the drill collar. Alternatively the permanent magnets and the RF receiver antenna and/or receiver electronics are placed on the non-rotating sleeve which is clamped against the borehole wall and decoupled from drilling vibrations, with the transmitting antenna located on the rotating drill collar. Alternatively a non-rotating stabilizer is provided above or below an NMR sensor. A stabilizer is activated to stabilize the rotating NMR sensor located on the drilling collar in the bore hole. The permanent magnets and receiving and transmitting antennas are located on a non-rotating sleeve that is clamped against the borehole wall to decouple the permanent magnets and receiving and transmitting antennas from drilling vibrations.

36 Claims, 4 Drawing Sheets

METHOD AND APPARATUS FOR A DOWNHOLE NMR MWD TOOL CONFIGURATION

CROSS REFERENCE TO RELATED APPLICATIONS

This application is a continuation in part and claims priority from the USPTO patent application Ser. No. 09/839,423 now U.S. Pat. No. 6,446,736 entitled "Non-Rotating Sensor Assembly For Measurement-While-Drilling Applications" filed on Apr. 20, 2001 by Thomas Kruspe et al., which is hereby incorporated by reference in its entirety and is a continuation and claims priority from application Ser. No. 09/247,340 now U.S. Pat. No. 6,247,542 entitled Non-Rotating Sensor Assembly For Measurement-While-Drilling Applications filed on Feb. 9, 1999 by Thomas Kruspe et al. which is hereby incorporated by reference in its entirety.

BACKGROUND OF THE INVENTION

1. Field of the Invention

This invention relates to a measurement-while-drilling (MWD) nuclear magnetic resonance (NMR) tool, and more particularly to a nuclear magnetic resonance tool having a non-rotating sleeve for containing a portion of the NMR electromagnetic transmitters, sensors and associated electronics which isolates the NMR sensor and transmitter from lateral motion induced by the drill string during drilling operations.

2. Description of the Related Art

To obtain hydrocarbons such as oil and gas, a drilling assembly (also referred to as the "bottom hole assembly" or the "BHA") carrying a drill bit at its bottom end is conveyed into the wellbore or borehole. The drilling assembly is usually conveyed into the wellbore by a coiled-tubing or a drill pipe. In the case of the coiled-tubing, the drill bit is rotated by a drilling motor or "mud motor" which provides rotational force when a drilling fluid is pumped from the surface into the coiled-tubing. In the case of the drill pipe, it is rotated by a power source (usually an electric motor) at the surface, which rotates the drill pipe and thus the drill bit.

Bottom hole assemblies ("BHA") generally include several formation evaluation sensors for determining various parameters of the formation surrounding the BHA during the drilling of the wellbore. Such sensors are usually referred to as the measurement-while-drilling ("MWD") sensors. Such sensors traditionally have electromagnetic propagation sensors for measuring the resistivity, dielectric constant, or water saturation of the formation, nuclear sensors for determining the porosity of the formation and acoustic sensors to determine the formation acoustic velocity and porosity. Other downhole sensors that have been used include sensors for determining the formation density and permeability. The bottom hole assemblies also include devices to determine the BHA inclination and azimuth, pressure sensors, temperature sensors, gamma ray devices, and devices that aid in orienting the drill bit in a particular direction and to change the drilling direction. Acoustic and resistivity devices have been proposed for determining bed boundaries around and in some cases in front of the drill bit. More recently, nuclear magnetic resonance ("NMR") sensors have gained extreme interest as MWD sensors as such sensors can provide direct measurement for water saturation porosity and indirect measurements for permeability and other formation parameters of interest.

NMR sensors utilize permanent magnets to generate a static magnetic field in the formation surrounding the MWD tool. A radio frequency (RF) coil disposed between the magnets or around the magnets induces a RF magnetic field. The magnets and the RF coils are positioned so that the static and RF fields are perpendicular to each other at least over a portion of the formation surrounding the NMR tool wherein the Lamor frequency which is determined by static field has a substantially uniform strength. This region is the region of interest or region of investigation. The NMR measurements corresponding to such region are needed to determine the formation parameters of interest.

MWD sensors are located inside or outside of a drill collar for performing measurements on the formation and its fluid content. A conventional drill collar is a metallic structure that conveys the torque required for the drilling operation. The drill collar acts as a conduit for the drilling fluid or mud that is used to lubricate the drill bit and carry the cuttings to the surface. Since audio and radio frequency electromagnetic fields do not penetrate the metallic body of the drill collar, sensors of electromagnetic fields are mounted outside the metallic body of the drill collar. These sensors are subject to abrasions resulting from particles in the drilling mud and the impact of the sensor against the earth formation. In some cases, shields or protective coatings are used on the drill collar to protect the sensors. Often, wear bands are employed on the drill collar to provide an appropriate standoff distance between the sensors and the formation thereby reducing or eliminating the impact of the sensor physically contacting earth formation.

A measurement-while-drilling tool is described in EP-A-0581666 (Kleinberg). The tool comprises a tubular drill collar; a drill head positioned at an axial end of the drill collar; and an NMR sensor. The NMR sensor comprises a pair of tubular main magnets (which generate a static (B0) magnetic field) each located in an internal recess of the drill collar, and an RF antenna located in an external recess in the drill collar between the main magnets. The RF antenna recess is optionally filled with a magnetically soft ferrite to improve the efficiency of the antenna.

An NMR well logging system is described in U.S. Pat. No. 4,629,986 (Clow et al.). Each of a pair of main magnets are separated by a gap in which a solenoid RF antenna is symmetrically disposed. The solenoid has a core of high permeability ferromagnetic material (soft ferrite).

The ferrite members may be axially spaced and/or spaced at right angles to the axis of the tool. A primary consideration in the design of an NMR MWD tool is making the NMR measurement insensitive to the effect of lateral tool motions, such as vibration and whirl. To a first approximation it is clear that it will not be possible to re-focus the NMR signal in the sensitive region if the tool is displaced laterally (i.e. in a direction parallel to the radius) during the pulse sequence by a distance which comprises a significant portion of the radial thickness of the sensitive region. Little is known about the precise motions of drilling tools down hole, however, the typical range of displacement is from 1 to 10 mm at frequencies of a few Hz. Rotation periods are between 1 and 3 Hz. The typical NMR measurement lasts from 50 ms to 1 sec, thus, these motions provide a significant detrimental effect on NMR measurement accurancy. Thus there is a need NMR tool configuration designed for reducing the effects of lateral motion on a NMR sensor during drilling operations.

SUMMARY OF THE INVENTION

The disadvantages of the prior art are overcome by the apparatus and method of the present invention. The present invention isolates the MWD NMR sensor or at least the motion sensitive part of the NMR tool from the lateral motion of the drill string while drilling a borehole. In one aspect of the present invention a NMR device is presented that includes components on a drill collar having a non-rotating sleeve containing permanent magnets for generating a static magnetic field, B0 for NMR measurements. The non-rotating sleeve is intermittently clamped against a borehole wall during NMR measurements and thus decoupled from the drill collar movements and drilling vibrations during NMR measurements. The NMR RF transmitter and receiver are located on the rotating drill collar. In another aspect of the present invention, the permanent magnets and the RF receiver antenna and electronics are located on the non-rotating sleeve which is intermittently clamped against the borehole wall during NMR measurements and thus decoupled from the drill collar and drilling vibrations during NMR measurements. Power for the receiver antenna can be derived from transmitter power or a separate transformer. The transmitting antenna is located on the rotating drill collar. In another aspect of the present invention at least one non-rotating stabilizer is provided above or below the NMR sensor located on the drill collar. The stabilizer is activated to stabilize the rotating NMR sensor located on the drill collar in the bore hole. In yet another aspect of the present invention the permanent magnets and receiving and transmitting antennae are located on a non-rotating sleeve that is intermittently clamped against the borehole wall during NMR measurements to decouple the permanent magnets and receiving and transmitting antennas from drilling vibrations during NMR measurments. The transmitter electronics and other electronics are located on the rotating drill collar. A rotating transformer transmits RF power to the transmitting antenna.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENTS

The disadvantages of the prior art are overcome by the apparatus and method of the present invention that isolates the NMR sensor and electronics from lateral motion of the drill string during NMR measurements while drilling a borehole.

Figure 1:
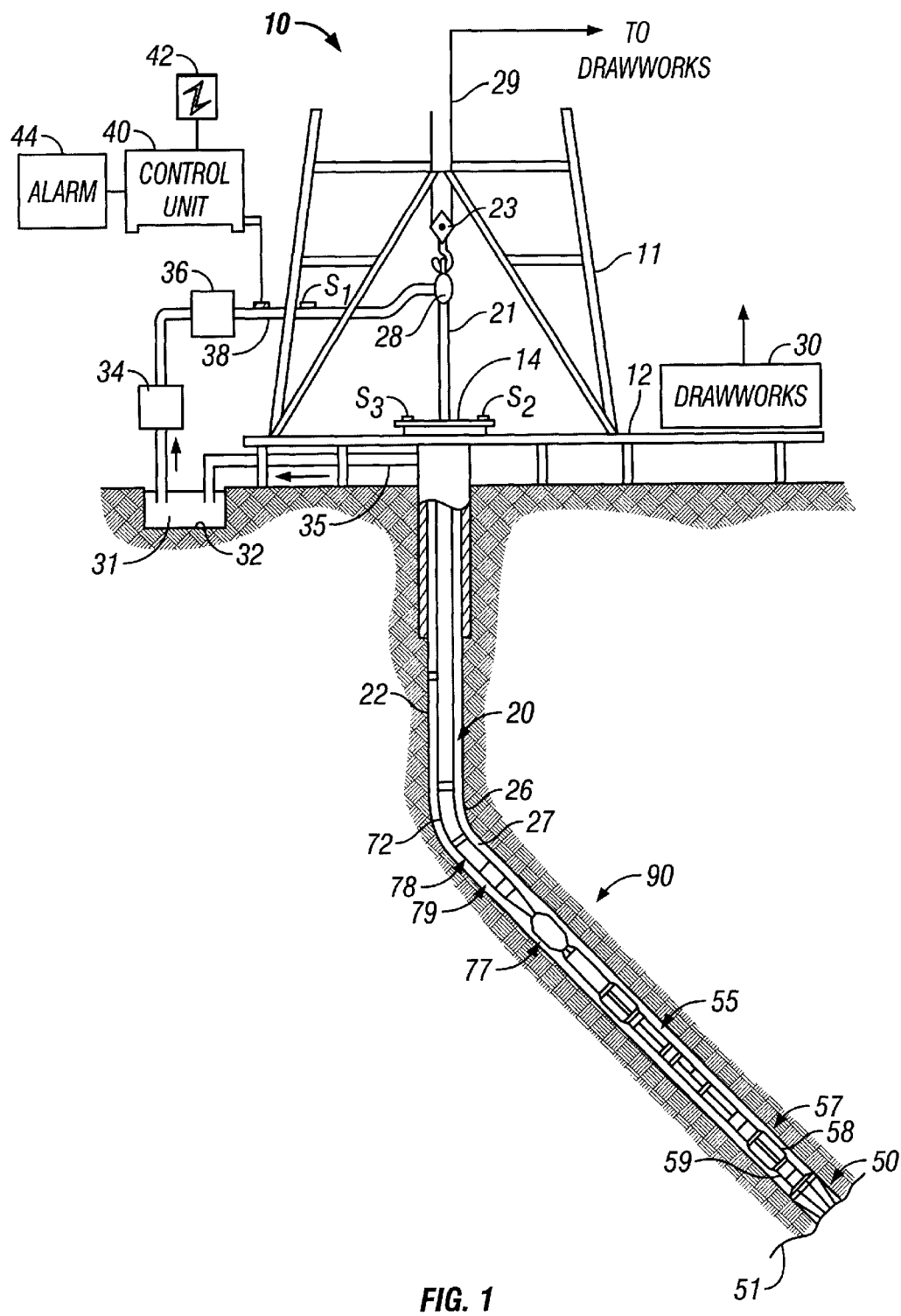
FIG. 1 illustrates a MWD drilling system with an NMR tool in accordance with the present invention in a wellbore.

FIG. 1 illustrates a schematic diagram of a drilling system 10 with a drill string 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover, such as an electric motor (not shown), at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger 36, fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cuttings or chips away from the drill bit 50. A sensor S1 preferably placed in the line 38 provides information about the fluid flow rate. A surface torque sensor S2 and a sensor S3 associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by rotating the drill pipe 22 only. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78, NMR tool 77 and an MWD tool 79 are all connected in tandem with the drill string 20. Flex subs, for example, are used in connecting the MWD tool 79 in the drilling assembly 90. Such subs and tools form the bottom hole drilling assembly 90 between the drill string 20 and the drill bit 50. The drilling assembly 90 makes various measurements including the nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors S1–S3 and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

A segment of drill pipe 22, illustrated in greater detail in FIGS. 2–6, illustrates the apparatus and method according to the present invention including a sleeve member, such as a sensor assembly, slidably coupled to a longitudinal member, such as a section of drill pipe, wherein, when the sleeve member is non-rotating and the longitudinal member is free to rotate. The sleeve member may be held in a non-rotating position through clamping engagement with the borehole wall. Decoupling of vibration between the sleeve member and the rotating drill string is achieved by shock absorbers 152. The assembly is additionally equipped with knuckle joints to de-couple the sleeve member from bending moments. An additional thruster is provided in the drill string between sleeve member and downhole motor or drill bit in order to additionally decouple axial vibrations. The sleeve member including the sensor assembly illustrated in the following FIGS. 2–6 describes a nuclear magnetic resonance device according to the present invention. However, the apparatus and method according to the present invention can be adapted for any MWD device or tool typically used on a rotating drill string.

Figure 2:
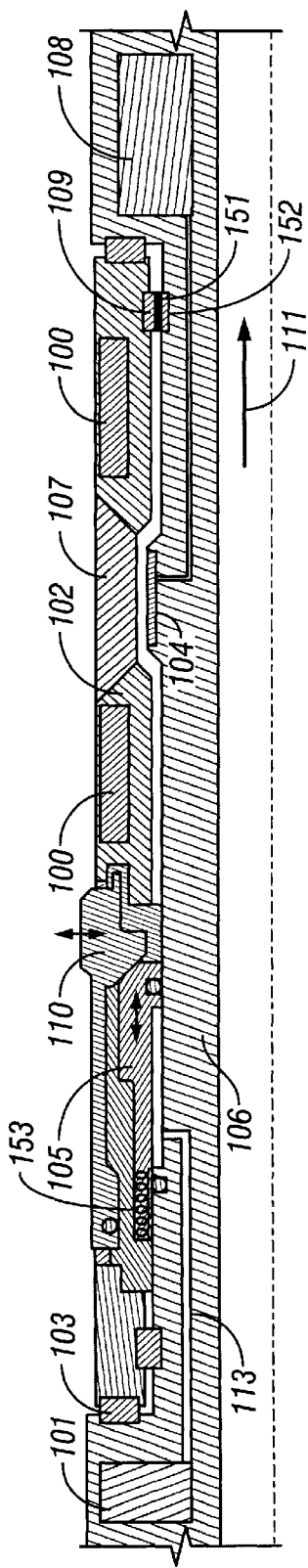
FIG. 2 illustrates a partial cross-section of an MWD NMR tool and drill collar comprising permanent magnets on a non-rotating sleeve in accordance with one embodiment of the present invention.

Turning now to FIG. 2, a schematic representation of a partial cross-section of a NMR tool and drill collar comprising permanent magnets 100 on a non-rotating sleeve 102 in accordance with one embodiment of the present invention is illustrated. As shown in FIG. 2, non-rotating sleeve 102 houses permanent magnets 100 and clamping rib 110. Clamping rib 110 rotationally fixes permanent magnets 100 and non-rotating sleeve 102 relative to the formation when pushed out by a clamping piston 105. The clamping piston is activated and retracted by clamping hydraulics according to the timing of the measurement. The clamping hydraulics 101 is equipped with a hydraulic system to press fluid through the hydraulic line 113 in order to move piston 105 and expand clamping rib 110.

The activation of clamping rib 110 can be done by any other means known in the art, for instance with an electrically driven cam or a spring which is pushing the piston out. The spring 153 in FIG.: 2 to FIG. 4 supports the clamping hydraulics 101. It could also be used without an additional clamping hydraulics providing a constant force of the clamping rib 110 against the borehole wall. Fixation of magnets 100 and non-rotating sleeve 102 with respect to the well bore and adjacent formation effectively decouples the non-rotating sleeve 102 and magnets 100 from lateral movement of drill collar 106 and forces the NMR- sensor to a momentarily rest during drilling operations. Bearings 103 and shock absorbers such as rubber blocks are implemented to effectively decouple the non-rotating sleeve. Receiving antenna 104 and NMR electronics 108 are provided on the drill collar 106. The transmitter and receiver RF-field penetrates through the RF-transparent section 107 of the non rotating sleeve. The configuration of FIG. 2 provides the advantage of de-coupling the permanent magnets from the rotating drill string during the period of NMR measurement time. This will effectively keep the static magnetic field constant in the formation during the period of measurement. The radio-frequency field is active only during the RF pulses, which is a short time of the entire NMR-measurement sequence. The fluctuation of the RF-field during this short time does not effect the measurement seriously.

The power supply for preamplifier and tuning electronics, which is at the non rotating sensor sleeve, can be derived from the high power transmitter pulses. Thus, the power supply of these electronics can actively dampen the circuit and can contribute to a short ring-down of the energy stored in the circuit after the RF-pulse. This is known to be an important aspect in pulse echo NMR to allow receiving of the echo as quickly as possible after the pulse.

Figure 3:
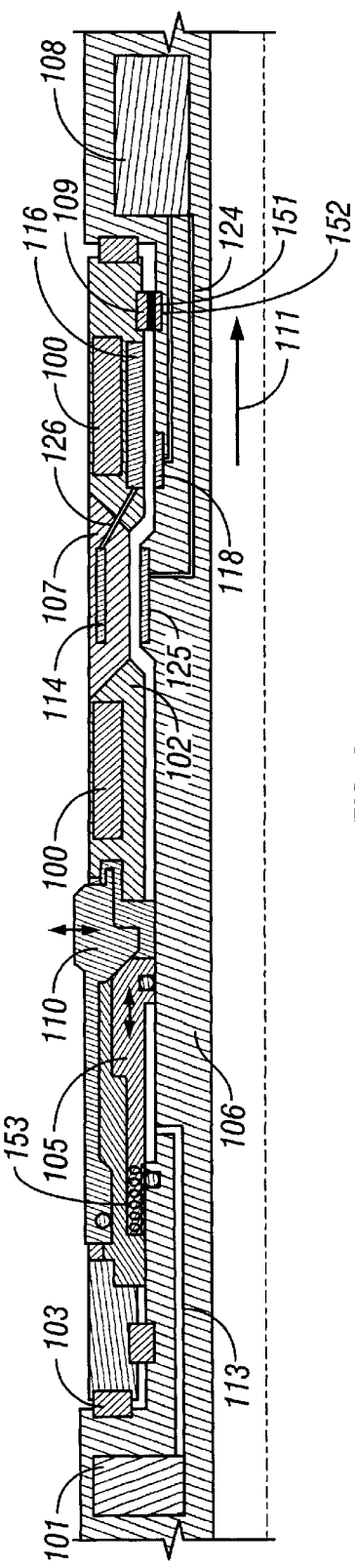
FIG. 3 illustrates a partial cross section of an MWD NMR tool and drill collar comprising permanent magnets and a RF receiver antenna and electronics on a non-rotating sleeve in accordance with another embodiment of the present invention.

Turning now to FIG. 3, a schematic representation of a partial cross section of an alternative embodiment of the present invention comprising an NMR tool and drill collar. The NMR tool comprising permanent magnets and a RF receiver antenna and receiver electronics on a non-rotating sleeve in accordance with another embodiment of the present invention. As shown in FIG. 3, non-rotating sleeve 102 houses the permanent magnets 100, RF receiving antenna 114 and clamping rib 110. Clamping rib 110 rotationally fixes permanent magnets 100, receiving antenna 114 and non-rotating sleeve 102 with respect the wellbore and the adjacent formation. Fixation of magnets 100 and non-rotating sleeve 102 with respect to the formation avoids significant relative movement between sensor and formation. and effectively decouples the non-rotating sleeve 102 and permanent magnets 100 from axial and lateral movement of drill collar 106 during drilling operations. The non-rotating sleeve is guided by bearings 103. Adjacent shock absorbers are implemented for further de-coupling of the NMR measurement tool from drilling induced motion. The transmitter antenna 125 and the NMR electronics 108 are on the rotating part of the assembly. Transmitter and NMR electronics 108 are connected to transmitting antenna 125 via electric wiring 124. Power transmission device 118 located on drill collar 106 couples electrical power to receiver electronics and receives data from receiver electronics 116 which are located on non-rotating sleeve 102. The electric power transmission device can be an inductive transformer providing a first winding on drill collar 106 and a second winding on the rotating part of the assembly. It can also be provided by a slip ring device. Receiver electronics 116 contain components for pre-amplification and digitization of received NMR signals, and the second half of the power transmission device 118 for transmitting data to the rotating NMR electronics 108 and for supplying power to the receiver electronics 116. Receiver electronics 116 are connected to the receiver antenna 114 via electric wire 126. The receiver antenna is embedded in a RF-transparent section 107 of the non-rotating sleeve. The transmitter antenna, located on the rotating part of the assembly, radiates a RF-magnetic field into the formation through the RF-transparent section of the non-rotating sleeve. The configuration of FIG. 3 provides the advantage of mechanically de-coupling the permanent magnets and the receiver of NMR-signals from the motion of the rotating drill string for the period of NMR measurement time. Further advantages are provided by placing the receiver antenna close to the borehole wall such that signal attenuation is limited, avoiding the necessity of transmitting high transmitter power to the non rotating sleeve. Since permanent magnets and receiver antenna are on the same module there is no magnetic induction in the receiver antenna induced by relative motion of the antenna in the static magnetic field.

Figure 4:
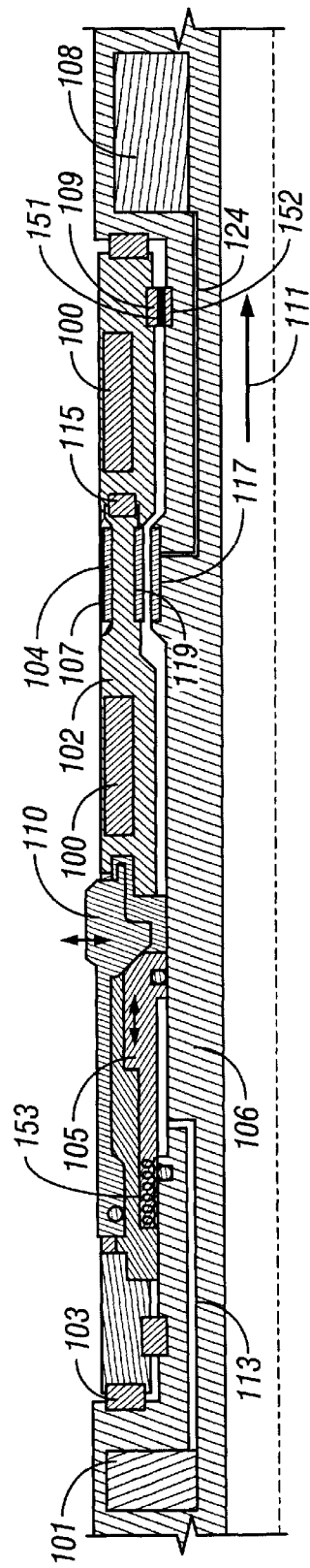
FIG. 4 illustrates a cross-section of an MWD NMR tool and drill collar comprising an NMR sensor in accordance with another embodiment of the present invention.
Figure 5:
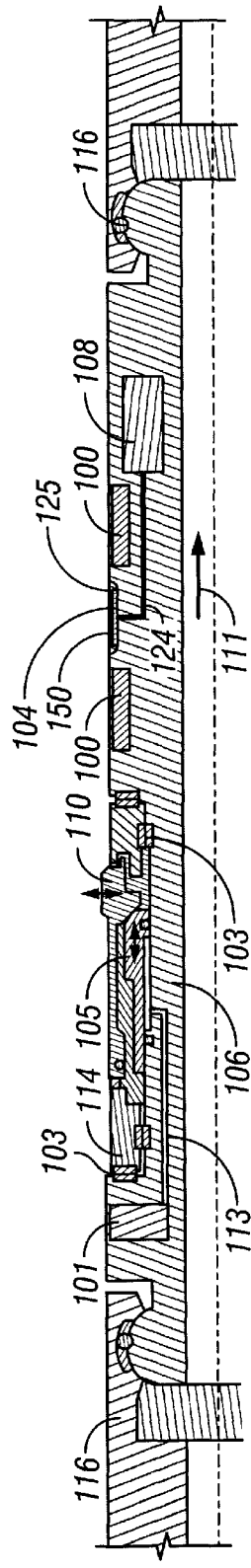
FIG. 5 illustrates a cross section of an MWD NMR tool and drill collar comprising permanent magnets and a RF receiver and transmitter antenna and electronics on a non-rotating sleeve in accordance with another embodiment of the present invention.

Turning now to FIGS. 4 5, a schematic representation of a partial cross-section of an alternative embodiment of the present invention is illustrated showing a NMR tool and drill collar providing a non rotating stabilizer above the NMR tool. The stabilizer is mounted on a non-rotating sleeve 114. The non-rotating sleeve is guided by bearings 103 on the rotating drill string. The tool is equipped with a clamping rib 110 which can be activated to engage the formation when pushed out by clamping piston 105. The clamping piston is activated and retracted by a clamping hydraulics, during NMR measurements according to the timing of the measurement. If engaged with the borehole wall this non rotating stabilizer minimizes the radial vibrations of the sensor assembly. The alternative embodiment of FIGS. 4 5 provides the additional advantage of not requiring an RF-transparent section for the transmission of RF-field and having at the same time the NMR-power electronics, the measurement controller electronics and the receiver at the rotating part of the assembly.

Turning now to FIG. 5, FIG. 5 is a schematic representation of a partial cross section of a NMR tool and drill collar 106 comprising permanent magnets 100, NMR-electronics 108 and a non rotating stabilizer 114 with a clamping rib 110 activated by clamping hydraulics 101 and clamping piston 105 both connected by hydraulic line 113. As shown in FIG. 5, RF receiver and transmitter antennae 104 are placed on the outside of a rotating part 106 and embedded in a RF-transparent material 150 for example epoxy resin or covered with a slotted metallic cover sleeve. The RF-receiver and transmitter antenna 104 is connected to the NMR-electronics 108 consisting of transmitter, receiver, NMR-sequence controller, processing unit with memory and power supply.

The NMR pulse is created in the NMR electronics 108 which is on the rotating drill collar 106 and is transmitted to the receiver and transmitter antenna by cable connection 124. The NMR-echo is received by the antennae 104 and transmitted to the NMR electronics. The NMR measurement is controlled by the NMR sequence controller. After acquiring the NMR data, the data is processed in the processing electronics and saved in the downhole memory.

The non-rotating stabilizer sleeve is fixed to the borehole-wall minimizing all relative radial movements between NMR-sensor and formation. The NMR-sensor which has a rotational invariant field rotates with the drill string. Radial motions, which could influence and destroy the measurement are prohibited by the stabilizer sleeve which is clamped against the borehole wall during the NMR measurement. This is performed by activating the clamping piston which pushes one ore more clamping ribs into contact with the borehole wall. The alternative embodiment of FIG. 5 provides the additional advantage of minimizing the amount of system components and electronics for transmission of power to the non rotating sensor and NMR-data to the rotating main electronics. The sleeve is relatively short which is advantageous in the drilling application.

Figure 6:
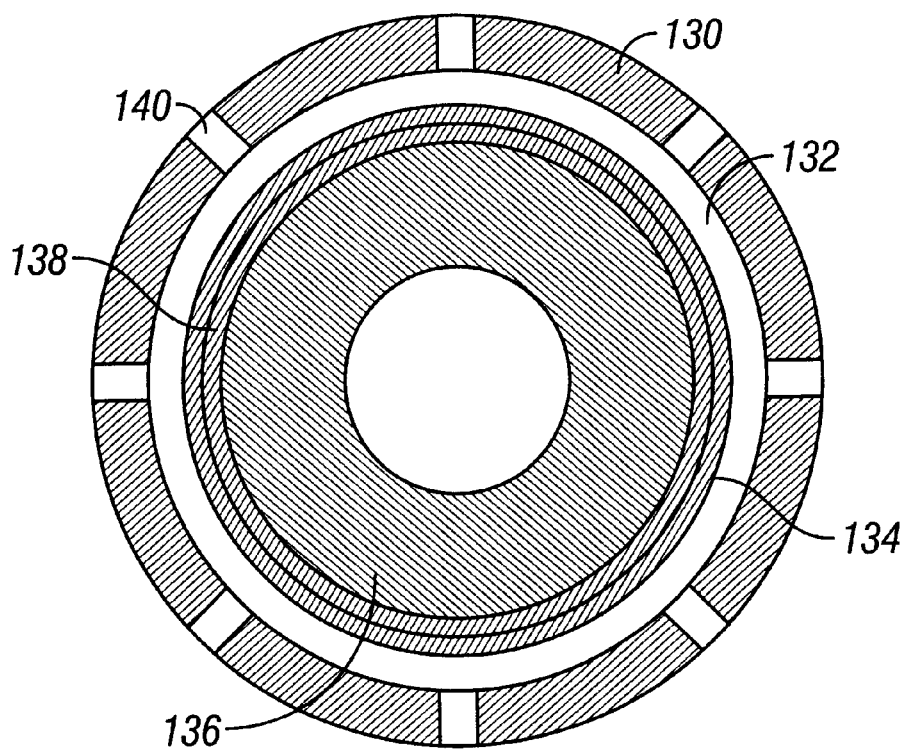
FIG. 6 is a cross section of an MWD NMR tool and drill collar illustrating one embodiment of a RF-transparent section of the tool in accordance with another embodiment of the present invention.

Turning now to FIG. 6, FIG. 6 is a schematic representation of a partial cross section of a preferred NMR tool and drill collar taken perpendicular to the longitudinal tool-axis. FIG. 6 illustrates an example of a RF-transparent area in which the NMR-antenna is embedded. The antenna windings 134 is wound around the drill collar 106. A flux-guiding material 138 is provided between antenna windings 134 and conductive drill collar 106 minimizing the eddy-currents in the conductive material and increasing the magnetic permeability in this area. The space 132 around the antenna windings 134 and between antenna and slotted tube is filled with non-conductive material such as epoxy or rubber. The RF-magnetic field penetrates through the slots 140 of the slotted tube which are filled with non conductive material.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. An apparatus for nuclear magnetic resonance (NMR) measurement while drilling a borehole in a formation and determining a parameter of interest of the formation surrounding the borehole during drilling operations, said apparatus comprising:

a longitudinal member for rotating a drill bit and adapted to be conveyed in the borehole the longitudinal member having a system generating an RF electromagnetic field associated with the formation for determining a parameter of interest of the formation; and an assembly rotationally coupled to said longitudinal member, said assembly further comprising at least one clamping device for engaging the borehole to stabilize the assembly to the borehole thereby rotationally fixing the assembly with respect to the borehole, wherein the motion of the assembly relative to the formation is minimized the assembly having a permanent magnet for inducing a static magnetic field in the formation for determining a parameter of interest of the formation.

2. The apparatus of claim 1 wherein the longitudinal member further comprises:

an NMR RF transmitter for transmitting an RF field into the formation and an NMR receiver for receiving an RF field associated with the formation for obtaining NMR measurements, relating to the parameter of interest.

3. The apparatus of claim 2 wherein the assembly further comprises a secondary side of a transformer for coupling to a rotating transformer on the longitudinal member.

4. The apparatus of claim 1 further comprising:

an NMR RF-transmitter positioned on the longitudinal member and an NMR receiver positioned on the assembly.

5. The apparatus of claim 1 wherein the longitudinal member is a segment of drill pipe.

6. The apparatus of claim 1 wherein the longitudinal member is a shaft on a downhole directional drilling assembly.

7. The apparatus of claim 1 wherein the longitudinal member is part of a measurement while drilling device comprising an NMR Sensor.

8. The apparatus of claim 1 wherein the assembly is a non-rotating stabilizer that can be fixed against the borehole wall minimizing relative motion between the longitudinal member and borehole wall.

9. The apparatus of claim 1 wherein the longitudinal member comprises shock absorbers for minimizing bending.

10. The apparatus of claim 1 further comprising a stabilizer located on the assembly.

11. The apparatus of claim 1 further comprising:

at least one shock absorber located between the longitudinal member and the assembly for dampening vibrations transferred to the assembly.

12. The apparatus of claim 1 wherein the NMR measurement apparatus is adapted to be conveyed on a drill string.

13. The apparatus of claim 1 wherein the NMR measurement apparatus is adapted to be conveyed on a coil tubing.

14. The apparatus of claim 1 wherein the at least one clamping device comprises at least one of: (i) hydraulically operated clamping device, (ii) spring operated clamping device, and (iii) electrically operated clamping device.

15. The apparatus of claim 1 wherein the assembly further comprises:

at least one slot for enabling electromagnetic energy to pass to and from an antenna located on a portion of longitudinal member covered by the assembly.

16. The apparatus of claim 15 wherein the at least one slot is filled with RF-transparent material comprising rubber or epoxy.

17. The apparatus of claim 15 wherein the slot is filled with RF-transparent composite material.

18. A method for nuclear magnetic resonance (NMR) measurement while drilling a borehole in a formation and determining a parameter of interest of the formation surrounding the borehole during drilling operations, comprising:

generating an RF electromagnetic field from a longitudinal member for rotating a drill bit and adapted to be conveyed in the borehole;

rotationally coupling an assembly to said longitudinal member;

clamping the assembly with at least one clamping device for engaging the borehole to clamp the assembly to the borehole thereby rotationally fixing the assembly with respect to the borehole, wherein the motion of the assembly relative to the formation is minimized; and generating a static magnetic field from the assembly for determining a parameter of interest of the formation.

19. The method of claim 18 further comprising:

transmitting from the longitudinal member an RF electromagnetic field associated with the formation for obtaining NMR measurements relating to the parameter of interest; and receiving on the longitudinal member an RF field associated with the formation for obtaining NMR measurements relating to the parameter of interest.

20. The method of claim 19 further comprising:

providing power to the assembly from a rotating transformer on the longitudinal member.

21. The method of 18 further comprising:

transmitting and receiving an NMR RF signal on the longitudinal member.

22. The method of claim 18 wherein the longitudinal member comprises a segment of drill pipe.

23. The method of claim 18 wherein the longitudinal member comprises a shaft on a downhole directional drilling assembly.

24. The method of claim 18 wherein the longitudinal member comprises part of a measurement while drilling device having a NMR Sensor.

25. The method of claim 18 further comprising:

engaging a non-rotating stabilizer that can be fixed against the borehole wall minimizing relative motion between longitudinal member and borehole wall.

26. The method of claim 18 further comprising:

minimizing bending of a longitudinal member by using comprised shock absorbers to make-up the longitudinal member.

27. The method of claim 18 further comprising:

stabilizing the assembly.

28. The method of claim 18 further comprising:

dampening vibrations to the assembly using at least one shock absorber located between the longitudinal member and the assembly.

29. The method of claim 18 wherein the apparatus is adapted to be conveyed on a drill string.

30. The method of claim 18 wherein the apparatus is adapted to be conveyed on a coiled tubing.

31. The method of claim 18 wherein the at least one clamping device is selected from the group consisting of: (i) hydraulically operated clamping device, (ii) spring operated clamping device, and (iii) electrically operated clamping device.

32. The method of claim 18 further comprising:

forming at least one slot on the assembly for enabling electromagnetic energy to pass to and from an antenna located on the elongated member covered by the assembly.

33. The method of claim 32 wherein the slot is filled with RF-transparent material comprising rubber or epoxy.

34. The method of claim 32 wherein the slot is filled with RF-transparent composite material.

35. An apparatus for nuclear magnetic resonance (NMR) measurement while drilling a borehole in a formation and determining a parameter of interest of the formation surrounding the borehole during drilling operations, said apparatus comprising:

a longitudinal member for rotating a drill bit and adapted to be conveyed in the borehole the longitudinal member having a system generating an RF electromagnetic field associated with the formation for determining a parameter of interest of the formation and a permanent magnet for inducing a static magnetic field in the formation for determining a parameter of interest of the formation; and an assembly rotationally coupled to said longitudinal member, said assembly further comprising at least one clamping device for engaging the borehole to stabilize the assembly to the borehole thereby rotationally fixing the assembly with respect to the borehole, wherein the motion of the apparatus relative to the formation is minimized.

36. A method for nuclear magnetic resonance (NMR) measurement while drilling a borehole in a formation and determining a parameter of interest of the formation surrounding the borehole during drilling operations, said method comprising:

rotating a longitudinal member adapted to be conveyed in the borehole;

generating an RF electromagnetic field associated with the formation for determining a parameter of interest of the formation from the longitudinal member;

generating a static magnetic field in the formation from the longitudinal member for determining a parameter of interest of the formation; and engaging the borehole to stabilize the assembly to the borehole thereby rotationally fixing the assembly with respect to the borehole, wherein the motion of the apparatus relative to the formation is minimized.

* * * * *